United States Patent [19]

Perreault et al.

[11] Patent Number: 5,684,802
[45] Date of Patent: Nov. 4, 1997

[54] SYSTEM AND METHOD FOR HYBRID CONTENTION/POLLING PROTOCOL COLLISON RESOLUTION USED BACKOFF TIMERS WITH POLLING

[75] Inventors: John A. Perreault, Hopkinton; Abhay Joshi; Mete Kabatepe, both of Norwood; Lawrence W. Lloyd, Wrentham; Stephen Schroeder, Stoughton, all of Mass.

[73] Assignee: Motorola, Inc., Schaumburg, Ill.

[21] Appl. No.: 434,334

[22] Filed: May 2, 1995

[51] Int. Cl.⁶ .................. H04L 12/403; H04L 12/413
[52] U.S. Cl. ................................. 370/448; 370/449
[58] Field of Search ......................... 370/85.2, 85.8, 370/85.3, 85.9, 95.2, 445, 447, 448, 449, 451, 452; 340/825.07, 825.08

[56] References Cited

U.S. PATENT DOCUMENTS

| | | | |
|---|---|---|---|
| 4,667,193 | 5/1987 | Cotie et al. | 370/85.8 |
| 5,355,375 | 10/1994 | Christensen | 370/448 |
| 5,434,861 | 7/1995 | Pritty et al. | 370/85.8 |

*Primary Examiner*—Benedict V. Safourek
*Assistant Examiner*—Min Jung
*Attorney, Agent, or Firm*—Darleen J. Stockley

[57] ABSTRACT

The system and method provide for efficiently resolving collisions in an environment where a transmitting device cannot hear collisions without a headend control station/control device, i.e., master, repeating transmission of all upstream frames in the downstream direction. This invention also prevents additional collisions from occurring between a device that is retransmitting and a device that is transmitting a packet for the first time. Further, the present invention allows continued utilization of a channel by other devices while contending devices are processing collision resolution procedures.

10 Claims, 2 Drawing Sheets

SYSTEM AND METHOD FOR HYBRID CONTENTION/POLLING PROTOCOL COLLISON RESOLUTION USED BACKOFF TIMERS WITH POLLING

CO-PENDING APPLICATIONS

The present application may be related to co-pending applications: Ser. No. 08/432,749 (pending), METHOD AND APPARATUS FOR A HYBRID CONTENTION AND POLLING PROTOCOL by Abhay Joshi, Mete Kabatepe, Lawrence W. Lloyd, John A. Perreault, And Stephen Schroeder; Ser. No. 08/433,905, now U.S. Pat. No. 5,596,577, METHOD AND SYSTEM FOR PROVIDING ACCESS BY SECONDARY STATIONS TO A SHARED TRANSMISSION MEDIUM, by Abhay Joshi, Mete Kabatepe, Lawrence W. Lloyd, John A. Perreault, And Stephen Schroeder; Ser. No. 08/433,877 (pending), METHOD AND APPARATUS FOR MULTILING POLLING, by Abhay Joshi, Mete Kabatepe, Lawrence W. Lloyd, John A. Perreault, And Stephen Schroeder; Ser. No. 08/433,878, now U.S. Pat. No. 5,608,727, METHOD AND SYSTEM FOR MANAGEMENT OF FREQUENCY SPECTRUM AMONG MULTIPLE APPLICATIONS ON A SHARED MEDIUM by John A. Perreault, Abhay Joshi Albert Chen and Eva Labowicz; Ser. No. 08/437,106 (pending), METHOD AND APPARATUS FOR A HYBRID LIMITED CONTENTION AND POLLING PROTOCOL, by Abhay Joshi, Mete Kabatepe, Lawrence W. Lloyd, John A. Perreault, And Stephen Schroeder; and Ser. No. 08/433,876 (pending), SYSTEM AND METHOD FOR HYBRID CONTENTION/POLLING PROTOCOL COLLISION RESOLUTION USING A COLLISION RESOLUTION USING A DEPTH FIRST SEARCH TECHNIQUE, by Abhay Joshi, Mete Kabatepe, Lawrence W. Lloyd, John A. Perreault, And Stephen Schroeder.

FIELD OF THE INVENTION

The present invention relates to communication in shared channel environments, and more particularly to collision resolution techniques for communication in shared channel environments.

BACKGROUND

In shared channel environments where simultaneous channel access can occur, a mechanism is needed to resolve the resulting collisions when two or more devices transmit a frame simultaneously. Most protocols in use today use a form of random backoff, where devices involved in the collision "hear" the collision as it occurs and resolve the collision by selecting a random number that controls a length of a timeout period that the device must wait before retransmitting. "Hear" typically means that a device receiver is tuned to the same channel as the transmissions, the device actually receives its own transmission and recognizes that the message is garbled, e.g., a cyclic redundancy code indicates that the message is incorrect and the device implies a collision from the incorrect message. After waiting for the timeout to occur, the device retransmits the frame, and its transmission may collide again with transmissions from the same device(s) involved in the original collision if the device(s) select approximately the same amount of time to wait before retransmitting, or may collide with transmissions by any other device that coincidentally chooses to transmit at the same time. When repeated collisions occur while a device is trying to retransmit, the device backs off longer and longer amounts of time, until a maximum number of retransmission attempts has occurred, at which time the device ceases to transmit the frame.

Under heavy channel loading, i.e., when a large number of devices have simultaneous channel access, the probability of multiple collisions occurring increases to the point of congestion collapse, i.e., very little or no traffic is transmitted successfully without collisions. Further, in some environments, only one headend control device can 'hear' the upstream transmissions of the remote tributary devices, and all remote tributary devices can hear the downstream transmissions of the control device. In these environments, the remote tributary devices cannot directly hear collisions. A typical solution is for the control device to repeat all upstream transmissions in the downstream direction so that tributaries can detect collisions. In environments where the majority of data traffic is between control stations and tributary stations (as opposed to between tributaries), where downstream retransmission is utilized for collision detection, the retransmission in the downstream direction is wasteful of downstream channel capacity.

Thus, there is a need for an efficient collision resolution protocol that minimizes downstream channel bandwidth use for collision resolution.

BRIEF DESCRIPTIONS OF THE DRAWINGS

DETAILED DESCRIPTION OF A PREFERRED EMBODIMENT

The present invention provides for efficiently resolving collisions in an environment where the transmitting device cannot hear collisions without the headend control station/ control device, i.e., master, repeating transmission of all upstream frames in the downstream direction. This invention also prevents additional collisions from occurring between a device that is retransmitting and a device that is transmitting a packet for the first time. Further, the present invention allows continued utilization of a channel by other devices while contending devices are processing collision resolution procedures.

The present invention is suitable for environments where there is a single control device/station which transmits to many tributary devices in the downstream direction and a plurality of tributary devices which transmit to the control device/station over a shared channel in the upstream direction.

The present invention is typically utilized in a hybrid polling/contention access environment where a control device/station grants access to the upstream channel(s) through polls. Generally, in this environment, a plurality of tributary devices may be polled individually, thus preventing each of these devices from having contention for the channel with any other device. Other devices may be polled as a group, providing the opportunity for collisions/contention.

The present invention utilizes a procedure for contention resolution wherein:

A) The control device sends a notification that a collision occurred.

B) Only the tributary devices which previously responded take part in the collision resolution.

C) Each contending device responds to a subsequent contention resolution poll after expiration of a retransmit/backoff timer for the contending device expires.

D) The control device may continue to poll other devices in a non-contention mode between the contention resolution polls.

E) Where collisions continue to occur during contention resolution, the control device typically increases the frequency of contention resolution polls in contrast to causing the each of the tributary devices to increase respective backoff timers.

Figure 1:
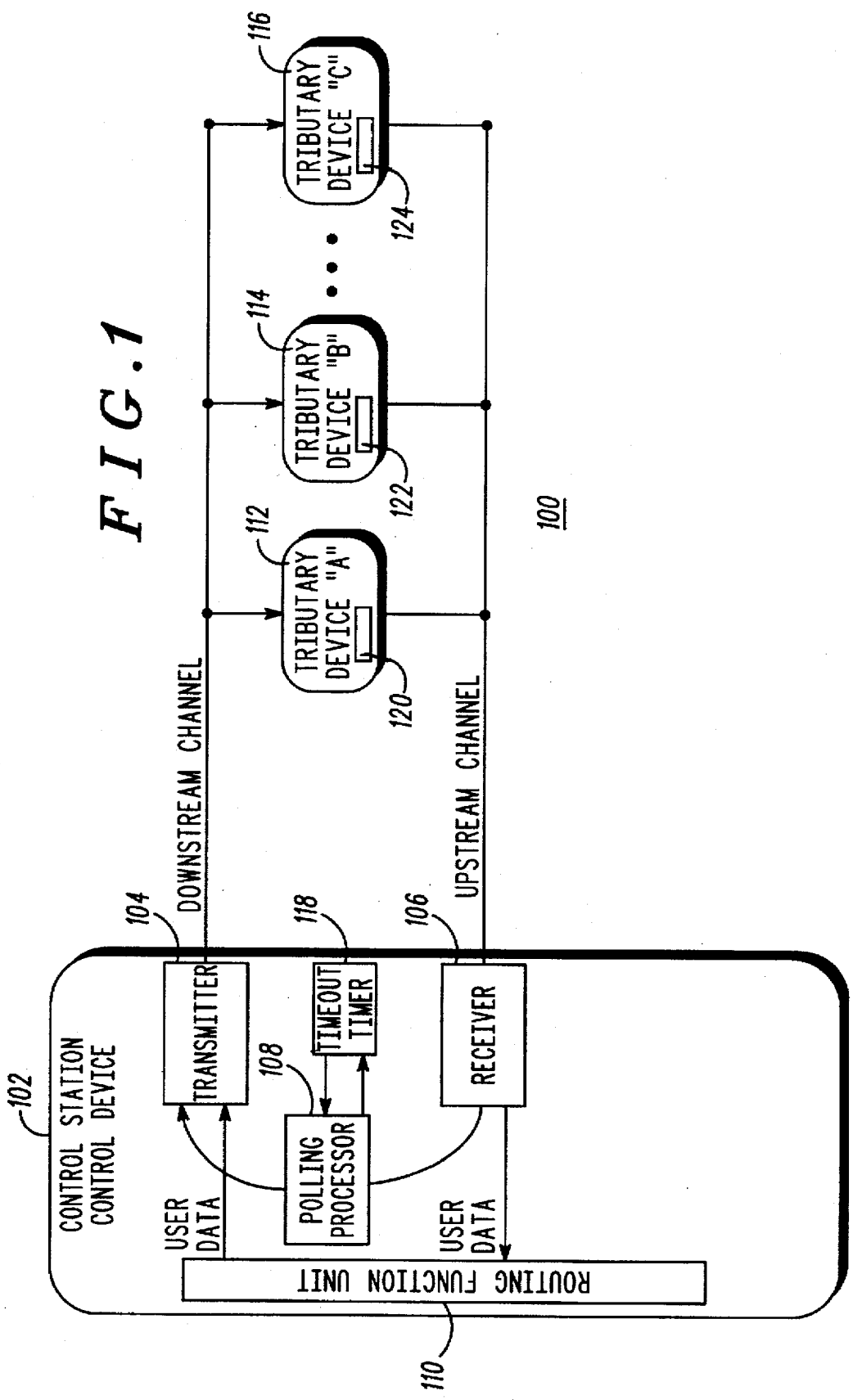
FIG. 1 is a block diagram of a simultaneous channel access system having a hybrid contention/polling protocol for utilizing a plurality of timers for resolution of collisions between transmissions received by a control station/control device from a plurality of tributary devices in a simultaneous channel access communication system in accordance with the present invention.

FIG. 1, numeral 100, is a block diagram of a simultaneous channel access system having a hybrid contention/polling protocol for utilizing a plurality of timers for efficient resolution of collisions between transmissions received by a control station/control device from a plurality of tributary devices in a simultaneous channel access communication system in accordance with the present invention. FIG. 1 shows a system that includes a control station/control device (102) having a timeout timer, a plurality of tributary stations (tributary devices; 112, 114, . . . , 116), each having a retransmit/backoff timer, a broadcast channel from the control station/control device to each of a plurality of tributary stations, and a shared channel from the plurality of tributary stations to the control station. The control station/control device (102) typically consists of a transmitter (104), a receiver (106), a polling processor (108), a user data interface (Routing Function Unit; 110), and a timeout timer (118). The transmitter (104) transmits user data from a routing function unit (110) downstream to the plurality of tributary stations (112, 114, . . . 116). The receiver (106) receives, on the upstream channel, frames from the plurality of tributary stations (112, 114, . . . , 116). The receiver (106) sends the frames to the routing function unit (110) and to the polling processor (108), which implements a predetermined collision resolution protocol and then signals the transmitter to send contention polling information in accordance with the predetermined collision resolution protocol. The tributary stations (112, 114, . . . , 116) are connected to the broadcast channels in parallel. One workable upstream-downstream channel combination is a 30 Mbps downstream channel and a 768 Kbps upstream channel.

Thus, the control station/control device (102) is operably coupled to receive transmissions, typically packets/frame of data, from a plurality of tributary devices and has a timeout timer (118). The control station/control device (102) utilizes a hybrid contention/polling protocol, described below, to resolve collisions between transmissions from the plurality of tributary devices (112, 114, . . . , 116). The plurality of tributary devices (112, 114, . . . 116) are operably coupled to the control station/control device (102) and are in parallel with one another. Each tributary device has a retransmit/backoff timer (120, 122, 124), for transmitting to the control station/control device and operating in accordance with the hybrid contention/polling protocol and polling to resolve collisions between transmissions of said plurality of tributary devices.

Typically, the hybrid contention/polling protocol comprises the steps of: upon a collision being determined at the control station/control device: A) sending, by the control station/control device, a collision resolution poll and setting the timeout timer at the control station/control device; B) retransmitting, by tributary devices having expired retransmit/backoff timers, and restarting retransmit/backoff timers by said tributary devices in accordance with a predetermined scheme. The timeout timer is set to a predetermined time period 'T'. The predetermined scheme is implementation of one of A–C: A) determining, by the control station/control device, where a response fails to be received, whether the predetermined time period 'T' of the timeout timer has expired; B) sending, by the control station/control device, where an ungarbled response is received, an acknowledgment to a tributary device that transmitted the ungarbled response; clearing, by the tributary device, the retransmit/backoff timer of the tributary device; and determining, by the control station/control device, whether the predetermined time period 'T' of the timeout timer has expired; and C) increasing, by the control station/control device, where a garbled response is received, a frequency of collision resolution polls according to a predetermined scheme; and restarting the timeout timer, by the control station/control device. Typically, restarting the timeout timer is resetting the timeout timer to zero. Generally, the transmissions of the tributary devices include packets/frames of data. Typically the retransmit/backoff timers of the tributary devices are set to time periods that are less than or equal to the predetermined time period 'T' of the timeout timer.

Figure 2:
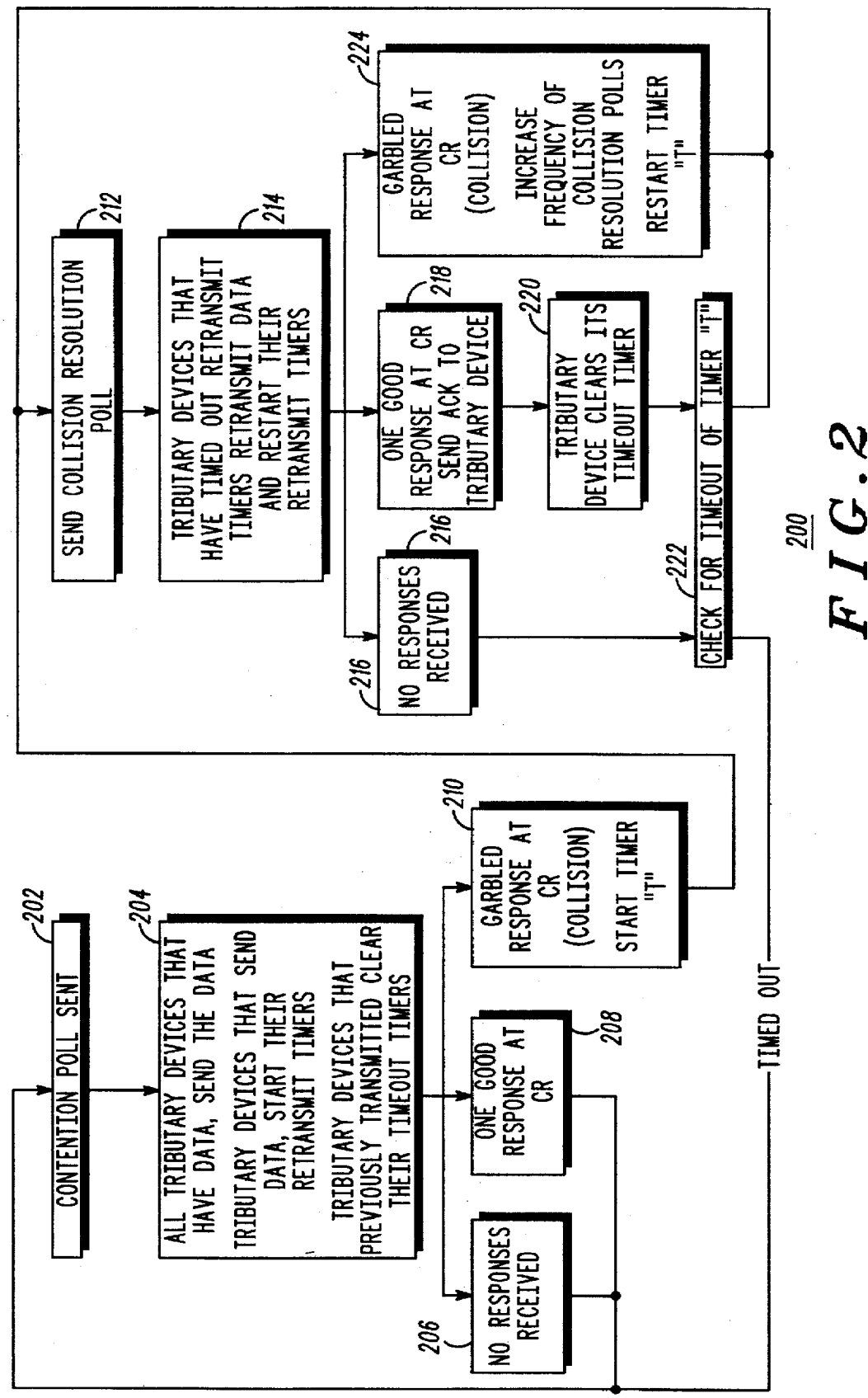
FIG. 2 is a system flow chart showing steps of contention polling and collision resolution in accordance with the method of the present invention.

FIG. 2, numeral 200, is a system flow chart showing steps of contention polling and collision resolution in accordance with the method of the present invention. The receiver provides notification to the polling processor when the receive channel is idle and available for a poll. The poll processor sends polls to the transmitter which allocate the upstream channel to a tributary station for an upstream packet. One type of poll allocates the upstream channel to one specific tributary device. The other type of poll is a contention access poll. Contention access polls allow any device which is not being polled individually to respond with its data. When more than one device responds to a contention poll, the data received at the control station/control device is garbled, representing a collision. In general, tributary devices with substantial upstream data are polled individually, and devices with little or no upstream data are polled via contention polls. The present invention provides a contention/polling collision resolution scheme that resolves collisions for contention polls and sends all of the data from all of the contending devices from the tributary devices to the control station.

The transmitter of the control device sends the polls to all of the tributary stations on the downstream broadcast channel. The tributary stations may be set to respond to individual polls or contention polls. The control device can command any tributary to operate in either any individual polling or contention mode of operation. In this manner, the control device can switch which devices are individually polled and which are contention polled based on changing user data traffic patterns.

When a tributary station which is in contention mode receives a contention poll, it transmits its data upstream. Where the tributary station has no data, the tributary does nothing. Where the tributary station sends data, a retransmit timer of the tributary station is also started utilizing a random number which spans the time for a number of contention polls.

At the control station, one of three responses may be received to a contention poll. Where there is no response, none of the contention tributaries had data to send. Where ungarbled data is received, exactly one contention tributary sent data. Where a garbled response is received, two or more devices have responded, causing a collision. Where no response is received or ungarbled data is received, processing proceeds as before. In the case of receipt of ungarbled data, a subsequent contention poll serves as an acknowledgment to the tributary device that transmitted the ungarbled data that it has been received by the control station. The tributary then clears its retransmit timer.

When a collision is detected (received data is garbled), the polling processor of the control station/control device begins collision resolution operation. First, a timeout timer having a predetermined timeout period 'T' is started. The timeout timer has a value equal to a largest random retransmit time which a tributary can have. Each subsequent contention poll is replaced with a collision resolution poll until the timeout timer times out, i.e., the time set has expired.

When a collision resolution poll is sent, only devices which transmitted data on the immediately previous contention poll may respond. This limits the population of devices to those whose transmissions have previously collided and prevents other devices having untransmitted data from transmitting and causing further collisions. When a collision resolution poll is received at a tributary device, the tributary device checks its retransmit timer. Where the retransmit timer of the tributary device has timed out, the tributary device responds to the poll and the retransmit timer is restarted. Where the retransmit timer has not yet timed out, then the tributary device waits for a next collision resolution poll to determine whether data may be transmitted.

Thus, on any collision resolution poll, one of three responses may be received at the control station. First, where there is no response, none of the retransmit timers of the contending devices timed out during the interval. Second, where ungarbled data is received, the control station/control device sends an acknowledgment to the tributary device that sent the ungarbled data, indicating that the data of the tributary device was successfully transferred and that the tributary device is no longer in the collision resolution population.

Thirdly, another collision may occur. Where another collision occurs, the control station/control device starts the timeout timer since retransmissions from tributary devices that experienced collisions of transmitted data may transmit at any time during the 'T' time period. Where subsequent collisions continue to occur, the control device may, where preselected, also increase the number of collision resolution polls sent during time 'T', thus decreasing the chance that any two tributary devices retransmit in response to a same collision resolution poll.

After each collision resolution poll, the timeout timer is checked at the control station. Where the timeout timer has timed out, all contending devices have timed out and successfully responded to a collision resolution poll. Thus, the control station/control device then resumes its contention access polls. Where the timeout timer has not timed out, the control station/control device continues to send collision resolution polls at preselected times.

Between collision resolution polls, the control device continues to poll individual tributary devices, allowing continued efficient utilization of upstream bandwidth during the collision resolution process.

Thus, the present invention provides many advantages, including: 1) the present invention allows continued utilization of the upstream channel for other individually polled tributary devices while contention resolution is occurring on a subset of devices; 2) the complexity of contention is implemented mostly in the control station, allowing for less expensive implementation of the multitude of tributary stations; and 3) the population of tributary devices contending for a channel is limited to those tributary devices involved in the initial collision, allowing more rapid and deterministic resolution of collisions.

We claim:

1. A simultaneous channel access system having a hybrid contention/polling protocol for resolving collisions between transmissions received by a control station/control device from a plurality of tributary devices, the system comprising:
   A) the control station/control device, operably coupled to receive the transmissions from the plurality of tributary devices, for utilizing the hybrid contention/polling protocol to resolve collisions between transmissions from the plurality of tributary devices;
   B) the plurality of tributary devices, operably coupled to send transmissions to the control station/control device, each tributary device having a retransmit/backoff timer for determining an expiration time before which the tributary device must remain silent when given an opportunity to retransmit by the control station/control device and after which the tributary device can retransmit when given the opportunity to retransmit by the control station/control device.

2. The simultaneous channel access system of claim 1 wherein the hybrid contention/polling protocol comprises the steps of:
   upon a collision being determined at the control station/control device:
      A) sending, by the control station/control device to the tributary devices, a collision resolution poll;
      B) upon receiving the collision resolution poll, retransmitting by each tributary device whose retransmit/backoff timer has reached its expiration time.

3. The simultaneous channel access system of claim 1 wherein the transmissions of the tributary devices include frames of data.

4. The simultaneous channel access system of claim 1 wherein the expiration times of the retransmit/backoff timers of the tributary devices are set to random time periods that are less than or equal to a predetermined timeout period.

5. The simultaneous channel access system of claim 1 wherein, upon sending a contention poll to the plurality of tributary devices authorizing a number of said tributary devices to transmit on the shared channel, the control station/control device receives one of:
   a null response indicating that none of the tributary devices transmitted;
   an ungarbled response indicating that exactly one of the tributary devices transmitted; and
   a garbled response indicating that transmissions from a plurality of tributary devices collided on the shared channel; and wherein:
      upon receiving the ungarbled response, the control station/control device sends an acknowledgement message to the tributary device indicating that the response was received by the control device; and
      upon receiving the garbled response, the control station/control device sends a collision resolution poll to the tributary devices authorizing any of the tributary devices whose retransmit/backoff timer has reached its expiration time to retransmit.

6. The simultaneous channel access system of claim 1 wherein, upon receiving a contention poll from the control station/control device authorizing the tributary device to transmit on the shared channel, the tributary device transmits one of:

a data response, if the tributary device has data to transmit; and a silent response, if the tributary device has no data to transmit; and wherein:

upon sending the data response, the tributary device starts its retransmit/backoff timer by setting the expiration time to a random timeout period.

7. A hybrid contention/polling protocol for resolution of collisions between transmissions received by a control station/control device from a plurality of tributary devices each having a retransmit/backoff timer for determining an expiration time before which the tributary device must remain silent when given an opportunity to retransmit by the control station/control device and after which the tributary device can retransmit when given an opportunity to retransmit by the control station/control device, comprising the steps of:

upon a collision being determined at the control station/control device:

A) sending, by the control station/control device, a collision resolution poll to the tributary devices;

B) upon receiving the collision resolution poll, retransmitting by each tributary device whose retransmit/backoff timer has reached its expiration time.

8. The hybrid contention/polling protocol of claim 7 wherein the transmissions of the tributary devices include frames of data.

9. The hybrid contention/polling protocol of claim 7 wherein the expiration times of the retransmit/backoff timers of the tributary devices are set to random time periods that are less than or equal to a predetermined time period.

10. The hybrid contention/polling protocol of claim 7 wherein, upon sending a contention poll to the plurality of tributary devices authorizing a number of said tributary devices to transmit on the shared channel, the control station/control device receives one of:

a null response indicating that none of the tributary devices transmitted;

an ungarbled response indicating that exactly one of the tributary devices transmitted; and a garbled response indicating that transmissions from a plurality of tributary devices collided on the shared channel; and wherein:

upon receiving the ungarbled response, the control station/control device sends an acknowledgement message to the tributary device indicating that the response was received by the control device; and upon receiving the garbled response, the control station/control device sends a collision resolution poll to the tributary devices authorizing any of the tributary devices whose retransmit/backoff timer has reached its expiration time to retransmit.

* * * * *